United States Patent [19]

Bright

[11] 4,450,539
[45] May 22, 1984

[54] APPARATUS FOR MEASURING THE RELATIVE POSITION OF A DOWNHOLE TOOL IN A BORE HOLE

[75] Inventor: Gary R. Bright, Tulsa, Okla.

[73] Assignee: Standard Oil Company (Indiana), Chicago, Ill.

[21] Appl. No.: 287,999

[22] Filed: Jul. 29, 1981

[51] Int. Cl.³ .......................... G01V 1/00; G01V 9/00
[52] U.S. Cl. .................................... 367/35; 166/255; 166/64; 340/860
[58] Field of Search .................... 166/255, 64; 175/45; 367/35; 340/860, 857; 33/304, 302, 126; 377/18; 226/100

[56] References Cited

U.S. PATENT DOCUMENTS 3,111,990  11/1963  Hayes .................................... 166/64

*Primary Examiner*—Nelson Moskowitz
*Assistant Examiner*—Ian Lobo
*Attorney, Agent, or Firm*—Lansing M. Hinrichs; William T. McClain; William H. Magidson

[57] ABSTRACT

An apparatus for accurately determining the relative positioning of a well logging sonde or downhole tool in a bore hole is disclosed. The apparatus comprises an anchor for engaging the wall of the bore hole in fixed position and adapted to be carried into the bore hole on the downhole tool suspended on a logging wireline to a selected level, and a release mechanism controllable from the surface for releasing the anchor from the tool so that the tool can move independently of the anchor element. A sensing cable interconnects the anchor and the tool and is payed out from a reel carried by the tool as the tool separates from the anchor. Means actuated by the sensing cable are provided for transmitting electrical pulses up the wireline to the surface to indicate the relative distance between the anchor and tool.

5 Claims, 3 Drawing Figures

APPARATUS FOR MEASURING THE RELATIVE POSITION OF A DOWNHOLE TOOL IN A BORE HOLE

BACKGROUND OF THE INVENTION

In geological exploration it is frequently desired to perform certain observations or carry out operations over limited segments of a bore hole located very substantial distances beneath the surface. In such cases the relative distances between locations where observations are made are of much greater significance than the actual distances from the surface. By way of example, knowing the actual thickness of an oil containing stratum is of great significance compared with knowing its depth below the surface, when seeking to estimate the potential production which might be available from a field. Sondes or logging tools are lowered into bore holes by cables and measurement of the amount of cable payed out indicates the elevation of the tool within the bore hole. In the case of deep holes, however, vertical oscillation of the tools occurs because of the elasticity of the suspending cable even though damped by bore hole fluids. Moreover, precise measurements of cable lengths when a mile or more of cable has been payed out are virtually impossible. Expansion and contraction of long cables due to temperature also leads to erroneous readings.

Accordingly, it is an object of this invention to provide an apparatus which will produce precise measurements of points at which readings or observations are made relative to each other within selected segments of a bore hole.

A second object is to provide a simple relatively rugged apparatus which is capable of sending electrical signals to the surface for indicating the relative distance between read points within a bore hole segment and which employs a minimum number of conductors in the wireline for operation and signal transmission.

Other objects and advantages of the apparatus of this invention will be apparent to those skilled in the art from the following description.

SUMMARY OF THE INVENTION

The apparatus of this invention for determining the relative distance between points at differing elevations within a segment of a bore hole comprises: a bore hole wall engaging anchor detachably connected to a downhole tool carried by a wireline; means controllable from the surface for detaching the anchor from the downhole tool to permit vertical separation of the tool and anchor, the anchor remaining stationary in said bore hole; a distance sensing cable carried by a reel attached to the tool and having its free end attached to the anchor; and an electrical pulse transmitter actuated as the sensing cable pays off of the reel connected through a pair of conductors in the wireline to a distance indicator located at the surface. In a preferred embodiment the reel is powered by an electrically driven motor to rewind the sensing cable on the reel. In the simplest embodiment of the apparatus of this invention the reel for the sensing cable can be eliminated and the lower end of the sensing cable simply passed through a passage through the tool emerging from the bottom thereof and continuing down the bore hole, its lower end being attached to a suitable weight to maintain tension.

DETAILED DESCRIPTION OF THE INVENTION

Figure 1:
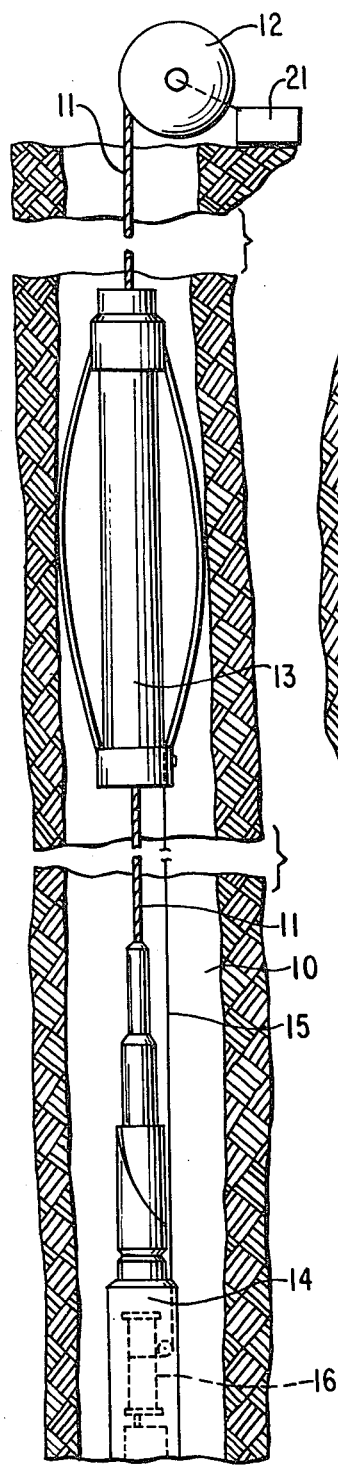
FIG. 1 is a side view of the apparatus of this invention showing the manner in which it is employed in a bore hole.
Figure 2:
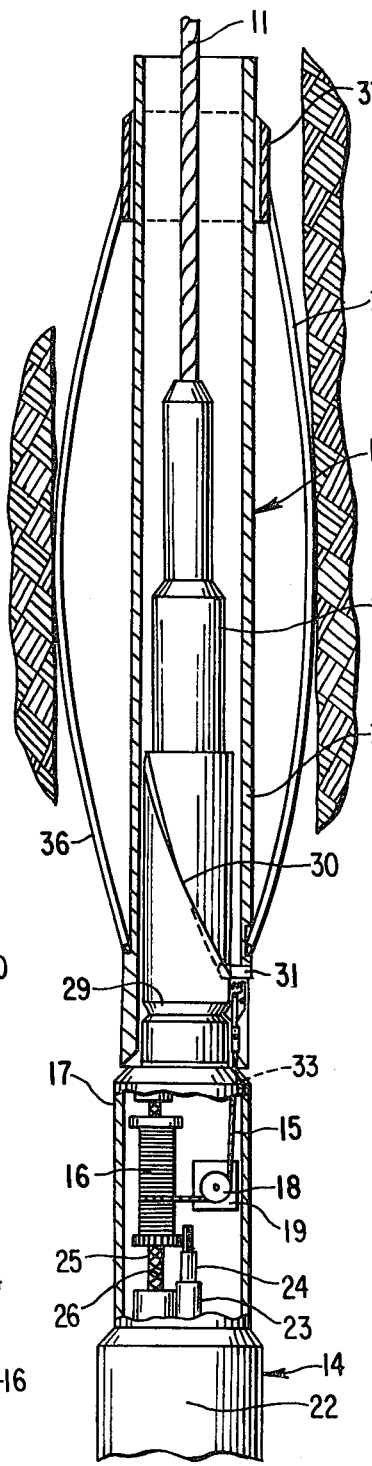
FIG. 2 is an enlarged side view showing details of a preferred embodiment of the detachable anchor and reel assembly.

In FIG. 1 a preferred embodiment of the apparatus of this invention is shown in operation within a bore hole 10. The apparatus is suspended upon a wireline 11 lowered into the bore hole 10 from a conventional drum 12 at the surface. The anchor 13 is shown in an anchored position in the bore hole disposed a distance above the downhole tool or sonde 14. Thus FIG. 1 illustrates the disposition of the elements of the apparatus when the distance between the sonde 14 and the anchor 13 is measured. To effect measurement a small diameter flexible sensing cable 15 is provided extending from anchor 13 to a reel 16 (best shown in FIG. 2) located in an upper portion 17 of the sonde 14. As shown in FIG. 2 the sensing cable 15 passes over a sheave 18 associated with a pulse transmitter 19. The pulse transmitter, which can be any conventional device for generating successive electric signals as the sheave 18 is rotated by the cable, is connected through a pair of conductors (not shown) in the wireline 11 to a suitable indicator 21 located at the surface. Alternatively the pulses can be generated by utilizing a sensing cable fabricated from a metal which is permanently magnetizable and magnetizing portions of the cable so as to provide signals as the cable passes through a sensing coil or other pick-up device. The sensing cable need not be cylindrical in section but can, if desired, be flat like a measuring tape and the term "cable" as used herein and in the claims is meant to include elements having such other sections.

In FIG. 2 the anchor 13 is shown in the position attached to the sonde 14 which it occupies when the two elements are lowered into or withdrawn from the bore hole 10. The downhole tool or sonde 14 can be provided with any desired conventional logging or measuring apparatus such as gamma ray, gravimeter or magnometer equipment or with formation fluid collection devices which are known to those familiar with the exploration and production art. Thus the lower portions of the sonde indicated at 22 in FIG. 2 are conventional. The upper portion 17 contains the sensing cable reel 16 and a rewind motor 23 for driving the reel through a slip clutch 24. In the preferred embodiment the reel 16 and the motor 23 are mounted so as to move vertically up and down as the sensing cable 15 is wound or unwound to effect level winding of the cable. This is accomplished by mounting the reel and motor on a shaft 25 having a double helix groove 26. Alternatively a level winding moving pawl of the kind used in a fishing reel can be employed. The purpose of the slip clutch is to provide a uniform tension on the sensing cable as it is pulled onto or off of the reel 16.

Figure 3:
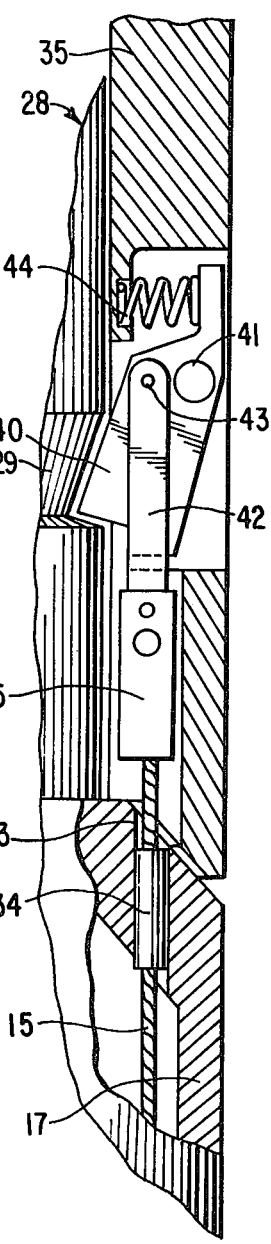
FIG. 3 is an enlarged sectional view showing the details of the locking device.

The upper portion 17 of the sonde is attached to the wireline or logging cable head 28 which is conventional except that its lower end is provided with a lock groove 29 and an indexing cam 30. The purpose of the indexing cam 30 which cooperates with an indexing pin 31 carried by the anchor 13 is to effect relative rotation of the sonde 14 and anchor 13 as the sonde 14 is drawn upwardly into the anchor to bring the point of attachment of the sensing cable 15 to the anchor 13 into alignment with the opening 33 through which it emerges from the upper portion 17 of sonde 14. These details are best shown in FIG. 3. Within the opening 33 a wiper 34 is mounted for the purpose of keeping solids from the bore hole out of the space within the element 17 which houses the reel 16 and its drive mechanism.

The anchor element 13 comprises a tubular body 35 and preferably three or four leaf springs 36 which engage the wall of the bore hole 10 or tubing in situations where the tool is to be used in a cased well. In the preferred embodiment which is illustrated the springs exert pressure upon the wall of the bore hole sufficient to hold the anchor in a stationary position when it is not attached to the sonde 14 but small enough to permit the anchor 13 to move up or down in the bore hole with the sonde 14 when it is attached thereto. The upper ends of the leaf springs 36 are attached to a slidable ring 37 received on the tubular body 35 and the lower ends are attached to the body 36 near its lower end. Those familiar with the art will appreciate that the above described anchor is quite similar to conventional centering devices which are utilized to maintain tools or instruments in the center of a bore hole. it will also be appreciated that many other kinds of anchor elements would be suitable such as those having one or more expandable arms which can be jacked out to engage the bore hole or an inflatable packer could be employed. The simple slidable form described above is preferred, however, because it requires no actuating power and does not utilize wireline conductors which are usually limited in number.

The mechanism for locking the sonde 14 to the anchor 13 is shown in FIG. 3. The lock comprises a pivotally mounted detent 40 which rotates about pin 41. A yoke 42 is attached to a second pin 43 and when the yoke 42 is moved downwardly rotates the detent 40 to withdraw it from the groove 29 in the wireline cablehead 28 thus releasing the wireline cablehead 28 and sonde 14 from the anchor 13. The lower end of the yoke 42 is attached to a slidable block 45 which is attached to the upper end of the sensing cable 15. By this arrangement unlocking is simply effected by energizing the rewind motor for a very short period to apply tension on sensing cable 15 compressing the detent spring 44 and withdrawing the detent 40 from the groove 29. Simultaneously, or thereafter, the wireline is payed out and the sonde 14 drops away from the anchor 13. the slip clutch 24 in the rewind motor drive is so adjusted as to permit unreeling of the sensing cable even though the motor 23 may be energized when the sonde 14 separates from the anchor 13. As the sonde 14 drops away from the anchor 13 the sensing cable 15 turns sheave 18 to actuate the pulse transmitter and send pulses up the wire line to the distance indicator 21 at the surface, the number of pulses transmitted being proportional to the distance the sensing cable 15 has been withdrawn from the sonde 14. It should be noted that vertical oscillation of the sonde will not produce false signals for the length of cable 15 above the sonde 14 falls slack upon upward oscillation of the sonde 14 and sheave 18 is not rotated. Thus the number of pulses transmitted corresponds to the distance of the sonde 14 beneath the anchor 13 at the bottom of each oscillation.

METHOD OF OPERATION

The usual method of operation of the preferred form of the apparatus involves initially assembling the anchor and sonde in locked relationship at the surface, the various elements being positioned as shown in FIG. 2. The assembly is then lowered into the bore hole to a desired depth. This can be indicated by the length of cable payed out from the surface drum or by signals generated by the sonde and sent to the surface. The sonde is then brought to a level at the top of the bore hole segment at which it is planned to take readings or perform operations. The rewind motor is then briefly energized to unlatch the sonde from the anchor and the sonde is lowered. The surface indicator indicates its distance below the anchor and correlation can be made between observations made by the sonde and its depth below the anchor. Alternatively, the sonde may be stopped at any point for stationary observations or operations if such are desired. The preferred length of sensing cable is between about 75 and 200 feet and when the surface indicator shows that the available cable is about payed out the sonde is raised to engage and latch on to the anchor. Prior to beginning upward travel of the sonde the rewind motor is energized through the wireline to rewind the sensing cable as the sonde is pulled upwards by the wireline. The same pair of wireline conductors can be utilized to power the motor as are employed to transmit pulses, if desired. Upon reaching the anchor the spring loaded detent latches into the groove on the cable head to lock the two together when the rewind motor is deenergized. The assembly can then be moved to some other elevation and the operation repeated.

As will be apparent to those skilled in the art the relative positioning of the sonde and anchor can be reversed, if desired, with the sonde above the anchor. When this is done the preferred method of operation is to lower the assembly to the bottom of the segment in which observations are to be made, then release the anchor and move the sonde upwards away from the anchor measuring distance with the sensing cable. The preferred arrangement, however, is to carry the anchor on top as it cannot be lost in the bore hole even if the latch fails to operate.

As noted in the above description many changes, modifications, and substitutions may be made in the apparatus of this invention and such changes and variations as well as others such as will present themselves to those familiar with the art may be made without departing from the spirit and scope of this invention which is defined in the following claims.

I claim:

1. An apparatus for determining the relative distance between points at differing elevations within a segment of a bore hole comprising: a bore hole wall engaging anchor detachably connected to a downhole tool carried by a wireline; means controllable from the surface for detaching said anchor from said downhole tool to permit vertical separation of said tool and anchor, said anchor remaining stationary in said bore hole; a distance sensing cable carried by a reel attached to the tool and having its free end attached to said anchor; and an electrical pulse transmitter actuated as the sensing cable pays off of said reel and connected through a pair of conductors in the wireline to a distance indicator located at the surface.

2. The apparatus of claim 1 wherein an electric motor acuatable from the surface is connected to said reel for rewinding said sensing cable when said downhole tool is moved toward said anchor.

3. The apparatus of claim 2 wherein latching means is provided for attaching said tool to said anchor and the end of said sensing cable is operatively connected to said latching means whereby actuation of said motor to tension said cable releases said latching means to detach said anchor from said downhole tool.

4. An apparatus for determining the relative distance between points at differing elevations within a segment of a bore hole comprising: a bore hole wall engaging anchor detachably connected to a downhole tool carried by a wireline; means controllable from the surface for detaching the anchor from the downhole tool to permit vertical separation of the tool and anchor, the anchor remaining stationary in said bore hole; a distance sensing cable attached at one end to said anchor and its other end extending to said tool; and an electrical pulse transmitter actuated as said tool moves relative to said sensing cable and connected through a pair of conductors in the wireline to a distance indicator located at the surface.

5. The apparatus of claim 5 wherein the sensing cable is formed at a magnetizable material and portions of it are selectively magnetized for the purpose of generating electrical pulses as said pulse transmitter is moved relative to said cable.

* * * * *

UNITED STATES PATENT OFFICE
CERTIFICATE OF CORRECTION

Patent No. 4,450,539  Dated May 22, 1984

Inventor(s) Gary R. Bright

It is certified that error appears in the above-identified patent and that said Letters Patent are hereby corrected as shown below:

Column 1, line 10, "located very" should be --located at very--.

Column 3, line 27, "it will" should be --It will--.

Column 3, line 52, "the slip clutch" should be --The slip clutch--.

Column 5, line 2, "acuatable" should be --actuatable--.

Column 5, line 9, "tension said cable" should be --tension of said cable--.

Signed and Sealed this

Twenty-first Day of January 1986

[SEAL]

Attest:

DONALD J. QUIGG

Attesting Officer  Commissioner of Patents and Trademarks